United States Patent
Gazzola et al.

(10) Patent No.: US 9,790,037 B2
(45) Date of Patent: Oct. 17, 2017

(54) MACHINE, PROCESS, CONTAINER AND PACKAGING FOR PACKING TETRAHEDRAL-SHAPED PRODUCTS

(71) Applicant: GAMPACK S.R.L., Piacenza PC (IT)

(72) Inventors: Giuseppe Gazzola, Travo PC (IT); Luciano Gandini, Rivergaro PC (IT)

(73) Assignee: GAMPACK S.R.L., Piacenza PC (IT)

( * ) Notice: Subject to any disclaimer, the term of this patent is extended or adjusted under 35 U.S.C. 154(b) by 0 days.

(21) Appl. No.: 14/910,316

(22) PCT Filed: Aug. 6, 2014

(86) PCT No.: PCT/IB2014/063736
§ 371 (c)(1),
(2) Date: Feb. 5, 2016

(87) PCT Pub. No.: WO2015/019300
PCT Pub. Date: Feb. 12, 2015

(65) Prior Publication Data
US 2016/0176654 A1      Jun. 23, 2016

(30) Foreign Application Priority Data

Aug. 7, 2013  (IT) .............................. MI2013A1355

(51) Int. Cl.
*B65G 47/84*     (2006.01)
*B65G 47/52*     (2006.01)
(Continued)

(52) U.S. Cl.
CPC .............. *B65G 47/52* (2013.01); *B65B 5/105* (2013.01); *B65B 35/58* (2013.01); *B65D 5/6664* (2013.01); *B65D 85/542* (2013.01); *B65G 47/244* (2013.01)

(58) Field of Classification Search
CPC ...... B65G 47/244; B65G 47/52; B65G 47/90; B65G 47/907; B65B 35/58; B65B 35/56; B65B 35/105
(Continued)

(56) References Cited

U.S. PATENT DOCUMENTS 3,250,386 A * 5/1966 Boynton ................... B65B 5/00
                                                        206/436
3,347,363 A * 10/1967 Dykes ..................... B65D 75/50
                                                        206/436
(Continued)

OTHER PUBLICATIONS

International Search Report and Written Opinion dated Nov. 27, 2014 for International Application No. PCT/IB2014/063736.(8 pages).

*Primary Examiner* — William R Harp
(74) *Attorney, Agent, or Firm* — Lucas & Mercanti, LLP

(57) ABSTRACT

A machine for packing tetrahedral products is disclosed which includes a conveyor belt driven in a first direction (F1) along a longitudinal direction (L), as well as a first handler suitable for grasping tetrahedral products carried the conveyor belt. The first handler has a handling head suitable for grasping a plurality of tetrahedral products arranged on the conveyor belt, in which one or more accumulators suitable for accumulating the tetrahedral products in a row are arranged along the conveyor belt. A rotating device is arranged along the conveyor belt before the accumulators for rotating a tetrahedral product with an orientation substantially opposite with respect to the preceding tetrahedral product on the same conveyor belt. The present invention also relates to a process which can be carried out by the machine, as well as a container and/or a packaging filled by means of such machine and/or process.

14 Claims, 10 Drawing Sheets

(51) Int. Cl.
*B65B 35/58* (2006.01)
*B65B 5/10* (2006.01)
*B65D 85/00* (2006.01)
*B65D 5/66* (2006.01)
*B65G 47/244* (2006.01)

(58) Field of Classification Search
USPC ..... 198/379, 374, 397.06, 411, 401; 53/142, 53/147, 446, 447, 448, 237, 240, 251, 53/475, 540, 544, 537
See application file for complete search history.

(56) References Cited

U.S. PATENT DOCUMENTS

| | | | |
|---|---|---|---|
| 3,396,507 A | | 8/1968 | Morris et al. |
| 3,618,758 A | | 11/1971 | Shaw et al. |
| 3,925,959 A | | 12/1975 | Dykes et al. |
| 4,901,502 A | * | 2/1990 | Colamussi ............... B65B 35/54 53/143 |
| 5,655,355 A | * | 8/1997 | Ramler .................. B65B 5/105 53/244 |
| 5,778,640 A | * | 7/1998 | Prakken ................. B65B 5/061 53/244 |
| 8,689,965 B2 | * | 4/2014 | Sjogren .................. B65B 35/24 198/415 |
| 2004/0069596 A1 | | 4/2004 | Davis et al. |
| 2016/0311563 A1 | * | 10/2016 | Skarin .................... B65B 35/38 |

* cited by examiner

MACHINE, PROCESS, CONTAINER AND PACKAGING FOR PACKING TETRAHEDRAL-SHAPED PRODUCTS

CROSS-REFERENCE TO RELATED APPLICATIONS

This application is a 371 of PCT/IB2014/063736, filed Aug. 6, 2014, which claims the benefit of Italian Patent Application No. MI2013A001355, filed Aug. 7, 2013.

FIELD OF THE INVENTION

The present invention relates to a machine for packaging, in particular a machine which can be used for packing tetrahedral-shaped products. The present invention also relates to a process which can be carried out by such machine, as well as a container and/or a packaging filled by means of such machine and/or process.

BACKGROUND OF THE INVENTION

Two aspects of fundamental importance in the packaging industry are the optimization of the space occupied by the products to be packed, namely the minimization of the empty spaces inside the container in which such products are arranged or the maximization of the density of the products inside the container, as well as the speed of the packing process.

A plurality of possible arrangements for the optimization of the space, such as the arrangement which provides for five or six tetrahedral products arranged side by side with their opposing faces being adjacent so as to form, in plan, a pentagon or a hexagon, are known with particular reference to the packing of elements having a substantially tetrahedral shape.

In a process for obtaining the desired positioning, tetrahedral products are arranged by hand inside the container. A drawback of this known process lies in the fact that the process cannot proceed at a high speed, as instead would be desirable, due to the bottleneck consisting of the slow manual filling of the containers.

An alternative process involves the use of known automatic machines that, in order to speed up the filling times of the containers, use a robotic arm that grasps a single tetrahedral product at a time and arranges it inside the container in a pseudo-random manner. This known machine also comprises two parallel conveyor belts, fed with opposite directions, which respectively transport the tetrahedral products and the containers in which these products are placed. A camera system is used as a control system to locate the position of each tetrahedral product present in bulk on the relevant conveyor belt, so as to suitably move the robotic arm. A drawback of this machine lies in the high complexity of the control system of the robotic arm, as well as in the relatively low speed of filling.

U.S. Pat. No. 3,396,507 A describes a machine in which the tetrahedral products are accumulated with a fan-shaped arrangement at the end of a conveyor belt to be grasped by handling means to be arranged in a container in a radial manner, with consequent limits in the optimization of the space filled by the tetrahedral products in the container.

U.S. Pat. No. 3,618,758 A discloses a container containing tetrahedral products that are arranged along a row with the lower faces arranged on a same plane and with an orientation opposite with respect to the previous tetrahedral product.

SUMMARY OF THE INVENTION

Object of the present invention is therefore to provide a machine and a process which are free from such drawbacks. Said object is achieved with a machine, a process, a container and a packaging, whose main features are specified in the attached claims.

An idea underlying the present invention consists in arranging the tetrahedral products in an ordered position already on a conveyor belt, so that the handling means that fill the containers can simultaneously grasp a plurality of tetrahedral products. Thanks to this arrangement, the filling speed of the containers and, therefore, the speed of the entire packing process can be significantly increased.

The process that allows to obtain such arrangement of tetrahedral products comprises a plurality of steps that can be carried out by an automatic machine according to the present invention while the tetrahedral products are on one or more conveyor belts. The process comprises a first phase in which the tetrahedral products are ordered in a row one behind the other, all with the same orientation.

In a second step, a stopping device blocks the tetrahedral products to feed them towards a third step at not too short intervals. In the third step, each tetrahedral product is rotated by a rotating device horizontally by 90° alternately in the two directions, namely each product is rotated in the opposite direction relative to the direction in which the previous tetrahedral product and then the next one are rotated.

In a fourth step the tetrahedral products are blocked by a first accumulator, if necessary, to be fed toward a fifth step when a sixth step, described later on, will be concluded.

In the fifth step the accumulated tetrahedral products released by the first accumulator are blocked by a second accumulator to be accumulated up to the desired number in the configuration according to the present invention. In this configuration the tetrahedral products are arranged along a row with the edges of welding of two contiguous tetrahedral products that are substantially perpendicular to each other and with the lower triangular faces arranged substantially on a same plane with an alternating "triangular wave" arrangement.

In a sixth step, all tetrahedral products thus accumulated are simultaneously taken by handling means that grasp them from the conveyor belt and transfer them inside the container to be filled, so as to optimize the occupied space. The handling means are preferably handling means with two degrees of freedom, for example achievable through an articulated system having rods forming an articulated pentalateral. Moreover, the machine advantageously comprises sensors, comprising for example cameras and/or photocells, which allow to scan the periods of each step.

The machine and the process according to the present invention also allow to fill the same container with a second layer of tetrahedral products above the first layer, in which the tetrahedral products belonging to the second layer have the welding edges perpendicular to the welding edges of the immediately underlying tetrahedral products of the first layer.

BRIEF DESCRIPTION OF THE DRAWINGS

Further advantages and characteristics of the machine, of the process, of the container and of the packaging according to the present invention will become apparent to those skilled in the art from the following detailed and non-limiting description of some embodiments thereof, with reference to the attached drawings in which.

DETAILED DESCRIPTION OF THE INVENTION

Figure 1:
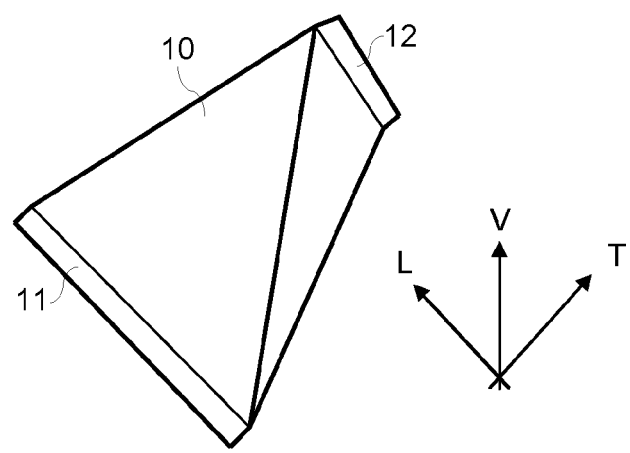
FIG. 1 shows a perspective view of a tetrahedral product.

Referring to FIG. 1, it is seen that a known tetrahedral product 10 has a substantially tetrahedral shape with four triangular faces, in particular in the shape of a substantially isosceles triangle, and two welding edges 11, 12 formed along two opposite edges and arranged on planes substantially perpendicular to each other.

Figure 2:
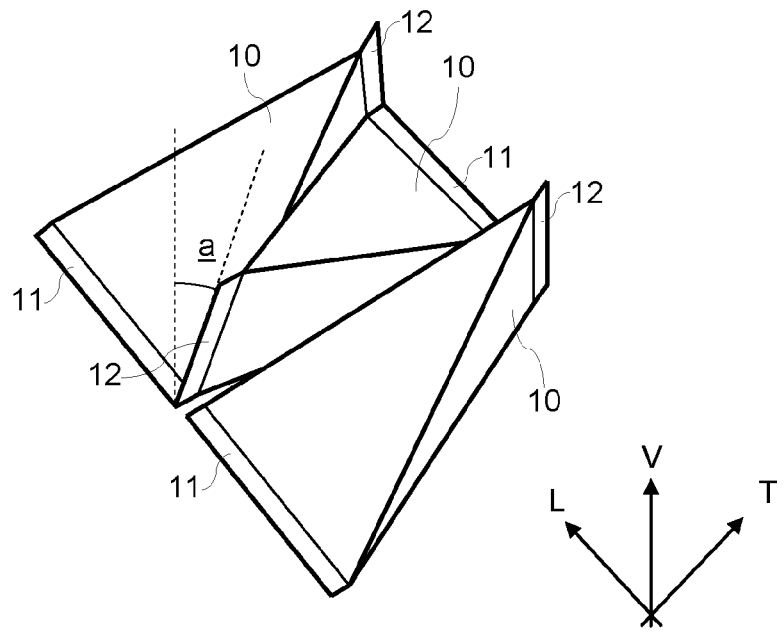
FIG. 2 shows a perspective view of an optimized arrangement of the tetrahedral products.

Referring to FIG. 2, it is seen that in the configuration according to the present invention the tetrahedral products 10 are arranged along at least one row in which the welding edges 11, 12 of two contiguous tetrahedral products 10 are substantially perpendicular to each other and the lower triangular faces are arranged with an alternating triangular-wave arrangement which develops along a longitudinal axis L on a substantially horizontal plane LT defined by the longitudinal axis L and by a transverse axis T. In particular, the first welding edges 11 of the tetrahedral products 10 are arranged substantially parallel to said plane LT together with the lower triangular faces, while the second welding edges 12 form with a plane LV perpendicular to the transverse axis T an angle substantially complementary to a base angle of the isosceles-triangle-shaped faces of the tetrahedral products 10.

Figure 3:
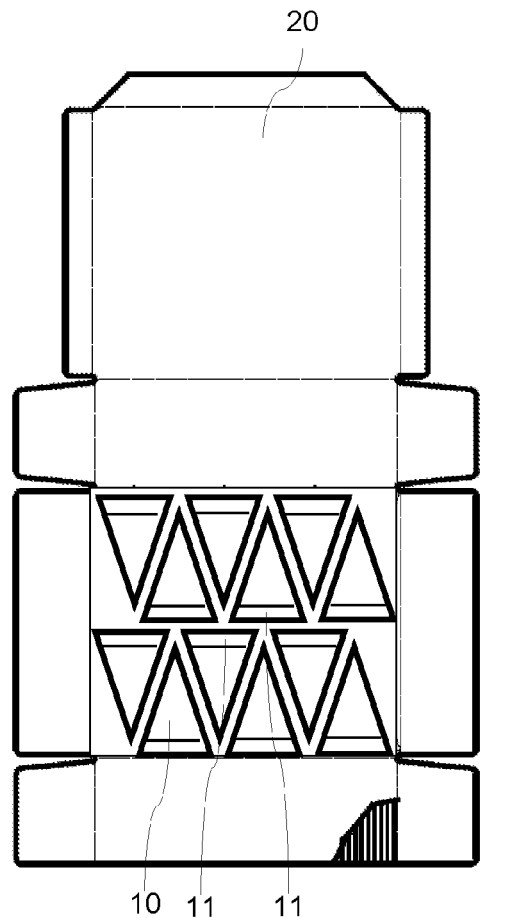
FIG. 3 shows a top view of an open container in which there are two adjacent rows of tetrahedral products arranged as in FIG. 2.

Referring to FIG. 3, it is seen that a container 20 with a substantially prismatic, preferably parallelepiped shape, for example obtained from a piece of cardboard suitably shaped and folded (but shown open in the figure), can be filled by placing side by side two rows of tetrahedral products 10 arranged in the manner shown in FIG. 2. In an alternative embodiment the two rows of tetrahedral products 10 may be arranged in a specular way.

Figure 4:
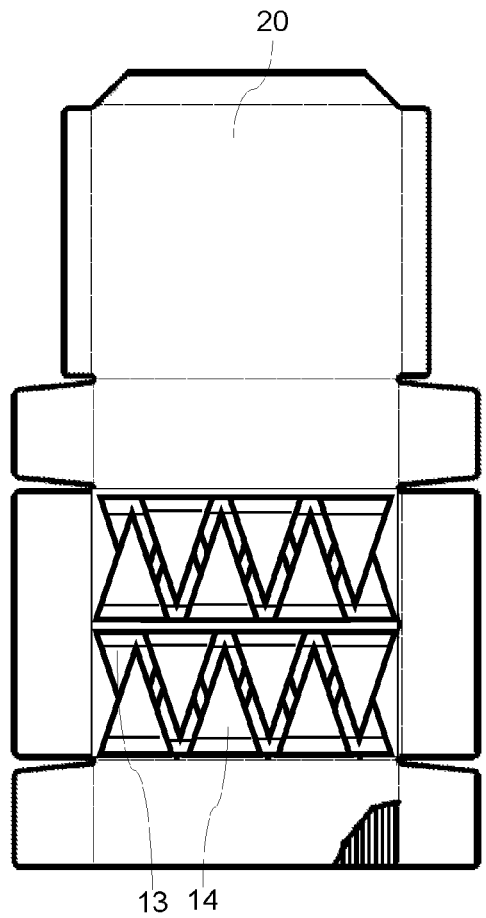
FIG. 4 shows a top view of the container of FIG. 3 in which there are two layers of tetrahedral products.

Referring to FIG. 4, it is seen that a second layer 14 of tetrahedral products 10 can be arranged on the first layer 13 within the container 20 of FIG. 3, without the need to increase its size. To this end, it is necessary that the two rows of tetrahedral 10 products belonging to the second layer 14 have an arrangement which is opposite and complementary with respect to the two rows of immediately underlying tetrahedral products 10 of the first layer 13. The upper triangular surfaces of the tetrahedral products 10 of the second layer 14 will be then arranged substantially on a same plane, which is in turn substantially parallel to the plane on which the lower triangular surfaces of the tetrahedral products 10 of the first layer 13 lie. Such planes are in turn substantially parallel to the base and to the lid of the container 20.

In the embodiment shown, the container 20 contains a total of twenty-four tetrahedral products 10 arranged on two layers 13, 14, each formed by two rows of six tetrahedral products 10. The first welding edges 11 of the tetrahedral products 10 are arranged substantially horizontal, namely substantially parallel to the base of the container 20. In other embodiments, containers 20 or packages having different shapes and/or dimensions can be filled in a similar manner to the described one, also with a different number of products, rows and/or layers.

Figure 5:
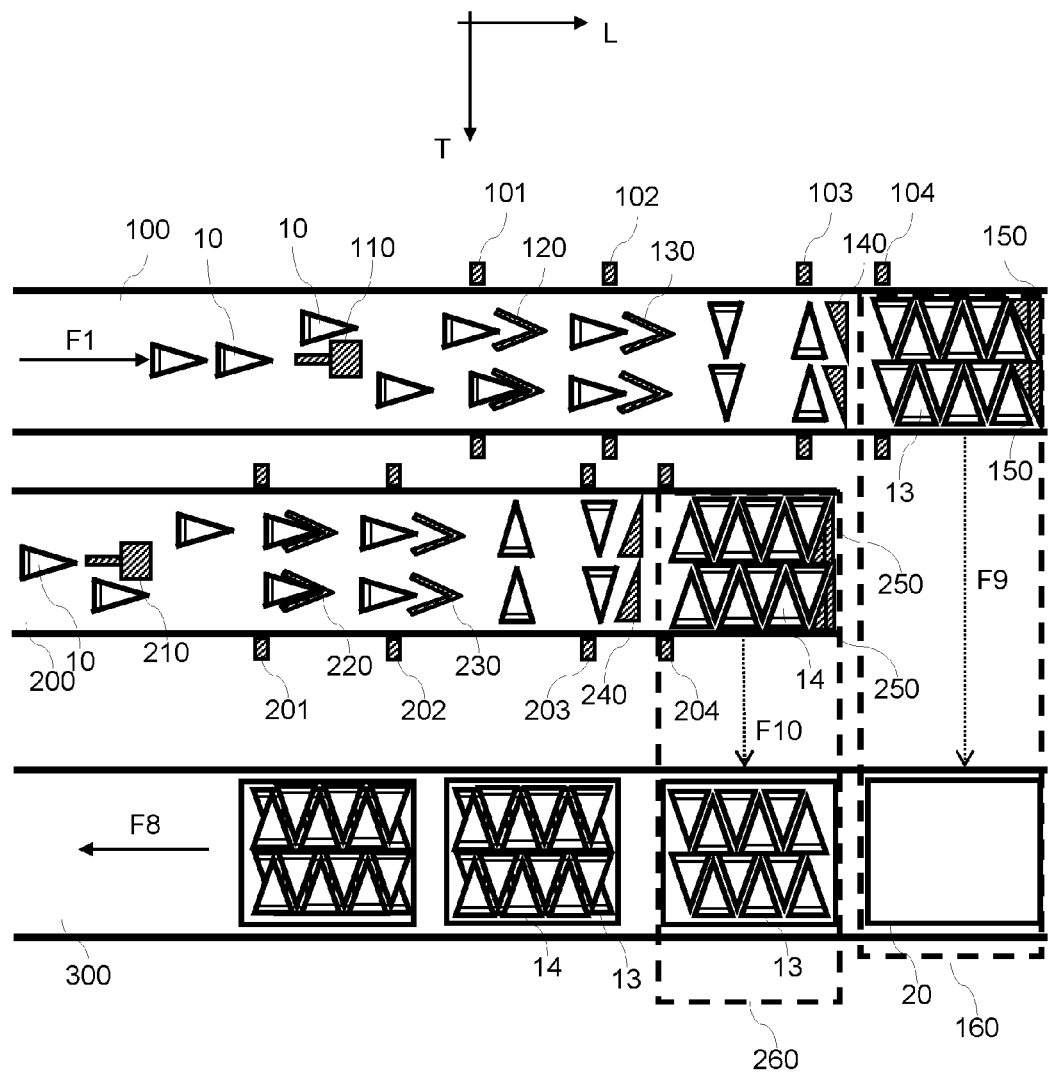
FIG. 5 shows a schematic top view of a first embodiment of the machine when filling the container of FIG. 4.

Referring to FIG. 5, it is seen that the container 20 can be filled with tetrahedral products 10 in an automated manner by using the machine according to the present invention, which comprises one or more conveyor belts, in particular three conveyor belts 100, 200, 300 which extend along a longitudinal direction L. In particular, a first conveyor belt 100 and a second conveyor belt 200 are driven in a same direction F1 and transport tetrahedral products 10 to be arranged inside of the containers 20, which are in turn transported by a third conveyor belt 300 which is driven in a direction F8 opposite to the direction F1 of the first two conveyor belts 100, 200.

In a first step of the process, arranging means 110, 210 arranged at the beginning of the first two conveyor belts 100, 200 and comprising a vertical vane that can rotate around a substantially vertical axis arrange tetrahedral products 10 one behind the other on two rows along the longitudinal direction L. The tetrahedral products 10 are oriented by guides (not shown in the figure) with the second welding edge 12, inclined by the angle a with respect to the plane LV, in an advanced position relative to the feed direction F1 of conveyor belts 100, 200.

In a second step of the process, first sensors 101, 201 arranged along the conveyor belts 100, 200 after the arranging means 110, 210 recognize the arrival of a tetrahedral product 10 and stop it, if necessary, by operating stopping devices 120, 220 so as to feed the products to the third stage at intervals sufficient to allow the execution of the third step.

In a third step of the process, second sensors 102, 202 arranged along the conveyor belts 100, 200 after the first stops 120, 220 recognize the arrival of a tetrahedral product 10 and actuate rotating devices 130, 230 to rotate it by substantially 90° in the horizontal plane, namely substantially parallel to the transverse axis T. In particular, each arriving product tetrahedral 10 is rotated in a direction opposite to the previous tetrahedral product 10, and the rotation on the conveyor belt 100 is reversed with respect to that carried out on the conveyor belt 200 so as to obtain on the two belts 100, 200 corresponding "triangular wave" arrangements that are in phase opposition.

In a fourth step of the process, third sensors 103, 203 arranged along the conveyor belts 100, 200 after the rotating devices 130, 230 recognize the arrival of a tetrahedral product 10 and stop it, if necessary, by operating first accumulators 140, 240 which in turn are arranged in an inverted position between the two conveyor belts. Further tetrahedral products 10 rotated by the rotating devices 130, 230 and transported by the conveyor belts 100, 200 accumulate behind the tetrahedral products 10 stopped by each first accumulator 140, 240, being thus arranged in a "triangular wave" alternating manner on two pairs of rows, as long as the products cannot proceed toward the fifth step. A first pair of rows is arranged on the first conveyor belt 100 and a second pair of rows is arranged on the second conveyor belt 200, each row on the first conveyor belt 100 being in phase opposition with the corresponding row on the second conveyor belt 200.

In a fifth step of the process, second accumulators 150, 250 arranged in the same way of the first accumulators 140, 240 stop the tetrahedral products 10 arriving from the fourth step while fourth sensors 104, 204 count the number of tetrahedral products 10 accumulated against said second accumulators 150, 250.

In a sixth step, the fourth sensors 104, 204, once they have counted the desired number of tetrahedral products 10, in the example illustrated six tetrahedral 10 products per row, actuate handling means 160, 260 (shown in FIG. 5 with dashed lines), which grasp simultaneously all tetrahedral products 10 accumulated by the second accumulators 150, 250 on one of the two conveyors 100, 200 and place them inside a container 20 transported by the third conveyor belt 300.

In order to fill the container 20 with two layers of tetrahedral products 10, it is appropriate to place the first conveyor belt 100 in a position advanced by a phase with respect to the second conveyor belt 200, namely with the first accumulators 140 aligned to the second accumulators 250 as shown in FIG. 5. Thus, the first plurality of tetrahedral products 10 coming from the first conveyor belt 100 can be arranged by the first handling means 160 inside an empty container 20 to form a first layer 13, as indicated by arrow F9. The container 20 is then advanced by the third conveyor belt 300 in the direction indicated by arrow F8 toward a position by the end of the second conveyor belt 200, so that a second plurality of tetrahedral products 10 can be arranged by the second moving means 260 inside the container 20 on the first layer 13 of tetrahedral products 10, as indicated by arrow F10, so as to obtain the second layer 14.

Figure 6:
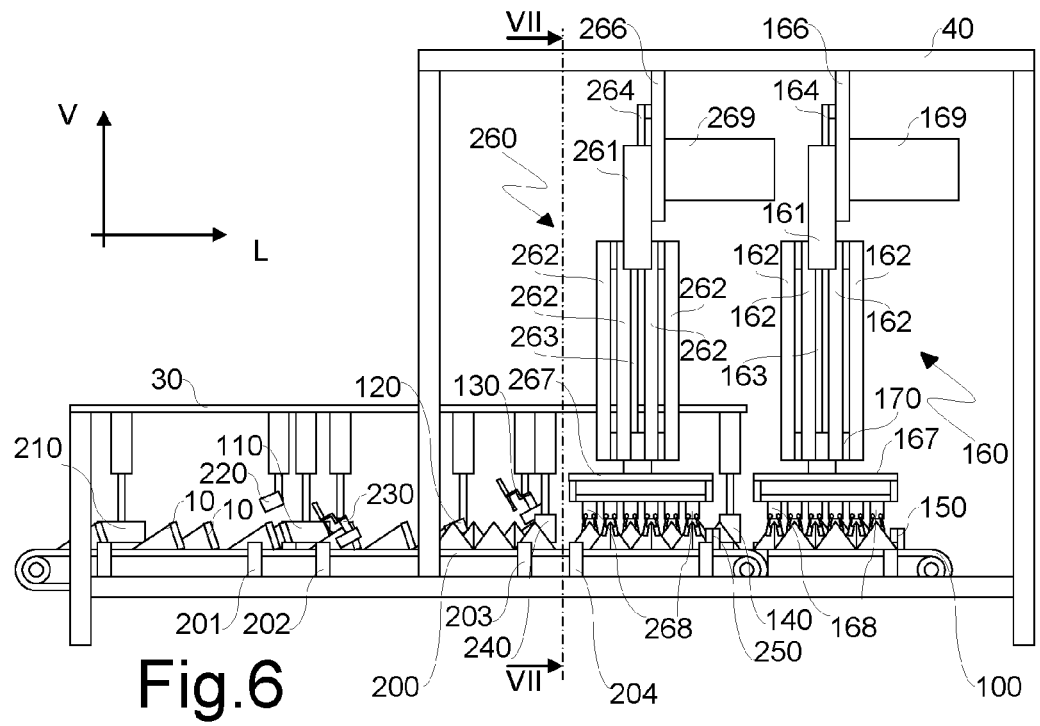
FIG. 6 shows a side view of the machine in a step of grasping the tetrahedral products.
Figure 7:
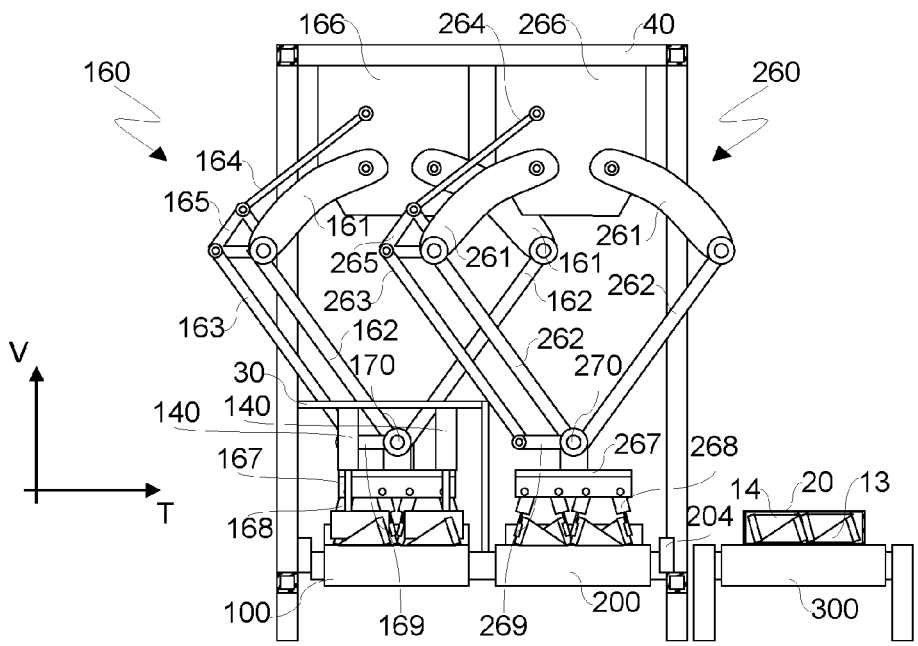
FIG. 7 shows the section VII-VII of FIG. 6.

Referring to FIGS. 6 and 7, it is seen that the machine according to the present invention comprises a first supporting structure 30 that extends above the first two conveyor belts 100 and 200 by the workstations performing the first four steps of the process. The arranging means 110 and 210, the stopping devices 120 and 220, the rotating devices 130 and 230, and the first accumulators 140 and 240 are mounted on the supporting structure 30 in sequence, along the longitudinal direction L and respectively on the two conveyor belts 100 and 200, while the second accumulators 150 and 250 are mounted on supports beside the belts as will be shown in FIG. 13. Since the devices working on the first conveyor belt 100 are similar to those working on the second conveyor belt 200, only the devices 120, 130, 140 and 150 of the first conveyor belt 100 will be described in detail hereinafter.

The handling means 160, 260 are mounted on a second supporting structure 40 arranged with respect to the first conveyor belt 100 and to the second conveyor belt 200, respectively, by the workstations that perform the fifth step of the process. The first handling means 160 are similar to the second handling means 260, so that the similar components are indicated with corresponding reference numbers and only the first handling means 160 will be described in detail hereinafter.

The first handling means 160 comprise a vertical frame 166, fastened to the second supporting structure 40, on which two arms 161 are pivoted to rotate in the plane TV defined by the transverse axis T and by the vertical axis V under the drive of two motors 169 mounted on said vertical frame 166. Each arm 161 is keyed to the shaft of a motor 169. Two pairs of connecting rods 162 are pivoted by the distal ends of the arms 161, respectively in front of and behind the arms 161, and the distal ends of each pair of connecting rods 162 are pivoted in a common joint 170 under which a handling head 167 is mechanically connected. According to such configuration, the vertical frame 166, the arms 161 and the connecting rods 162 form an articulated pentalateral which allows to move the handling head 167 on the plane TV in positions determined by the rotation of the arms 161, namely by the drive of motors 169.

The handling head 167 comprises a plurality of first grasping means 168 arranged alternately and on parallel rows, in order to grasp simultaneously the plurality of tetrahedral products 10 present on the first conveyor belt 100 to transfer it inside a container 20. In the embodiment shown, the grasping means 168 are grippers which grasp the tetrahedral products 10 at their second welding edge 12 lying on the plane TV. In other embodiments the grasping means may comprise mechanically equivalent means such as suction cups or a combination of grippers and suction cups.

In order to improve the stability of the handling head 167, the handling means 160 may advantageously comprise a first rod 164 pivoted between the frame 166 and a first vertex of a plate 165, in turn pivoted at a second vertex to the distal end of an arm 161, as well as a second rod 163 pivoted between the third vertex of the plate 165 and a connecting element 169 rigidly connected to the handling head 167 at the joint 170 between the connecting rods 162.

In this way, the frame 166, the first rod 164, an arm 161 and the plate 165 form a first articulated quadrilateral while the second rod 163, the plate 165, the connecting rods 162 and the connecting element 169 form a second articulated quadrilateral. The two articulated quadrilaterals allow to maintain in the same substantially horizontal position the handling head 167, so that the latter does not oscillate around the joint 170 connecting it to the articulated pentalateral when the handling occurs.

Figure 8:
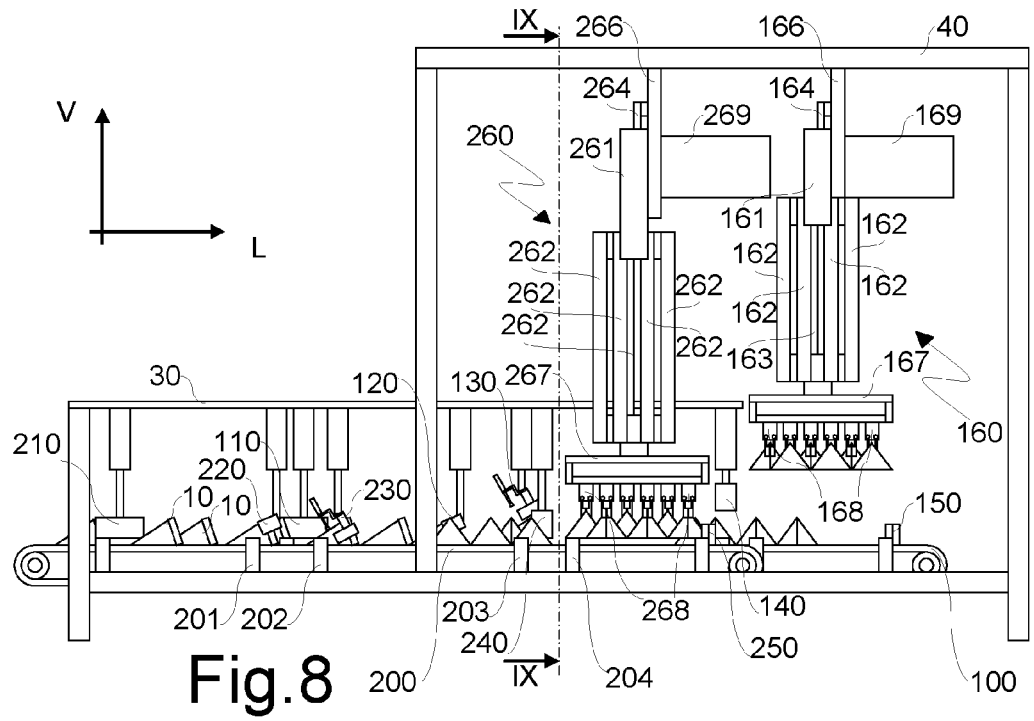
FIG. 8 shows a side view of the machine in a step of transferring the tetrahedral products.
Figure 9:
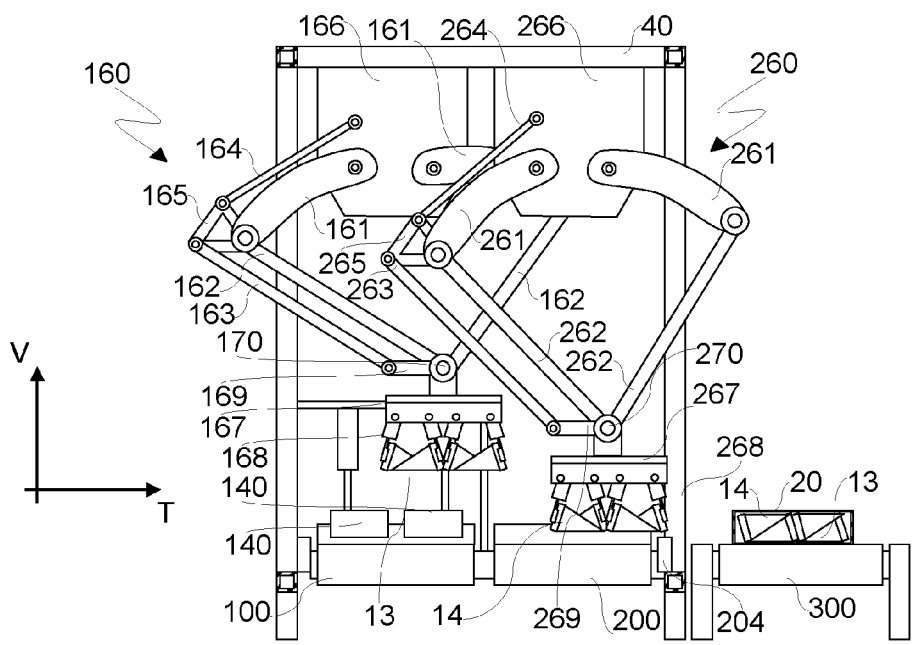
FIG. 9 shows the section IX-IX of FIG. 8.

Referring to FIGS. 8 and 9, it is seen that during the sixth step of the process the first handling means 160 grasp the first plurality of tetrahedral products 10 present on the first conveyor belt 100 and deposit it within the container 20 so as to form a first layer 13. The second moving means 260 grasp the second plurality of tetrahedral products 10 present on the second conveyor belt 200 and, in order to form a second layer 14, deposit it within the container 20 which in the meantime has advanced on the third conveyor belt 300. In order to improve the insertion of the second layer 14 on the first layer 13, the second handling head 267 may comprise actuators that rotate the grasping means 268 on the plane TV in such a way that the upper triangular faces of the tetrahedral products 10 that will form the second layer 14 are in a substantially horizontal position, namely arranged on a plane substantially parallel to the plane LT.

Figure 10:
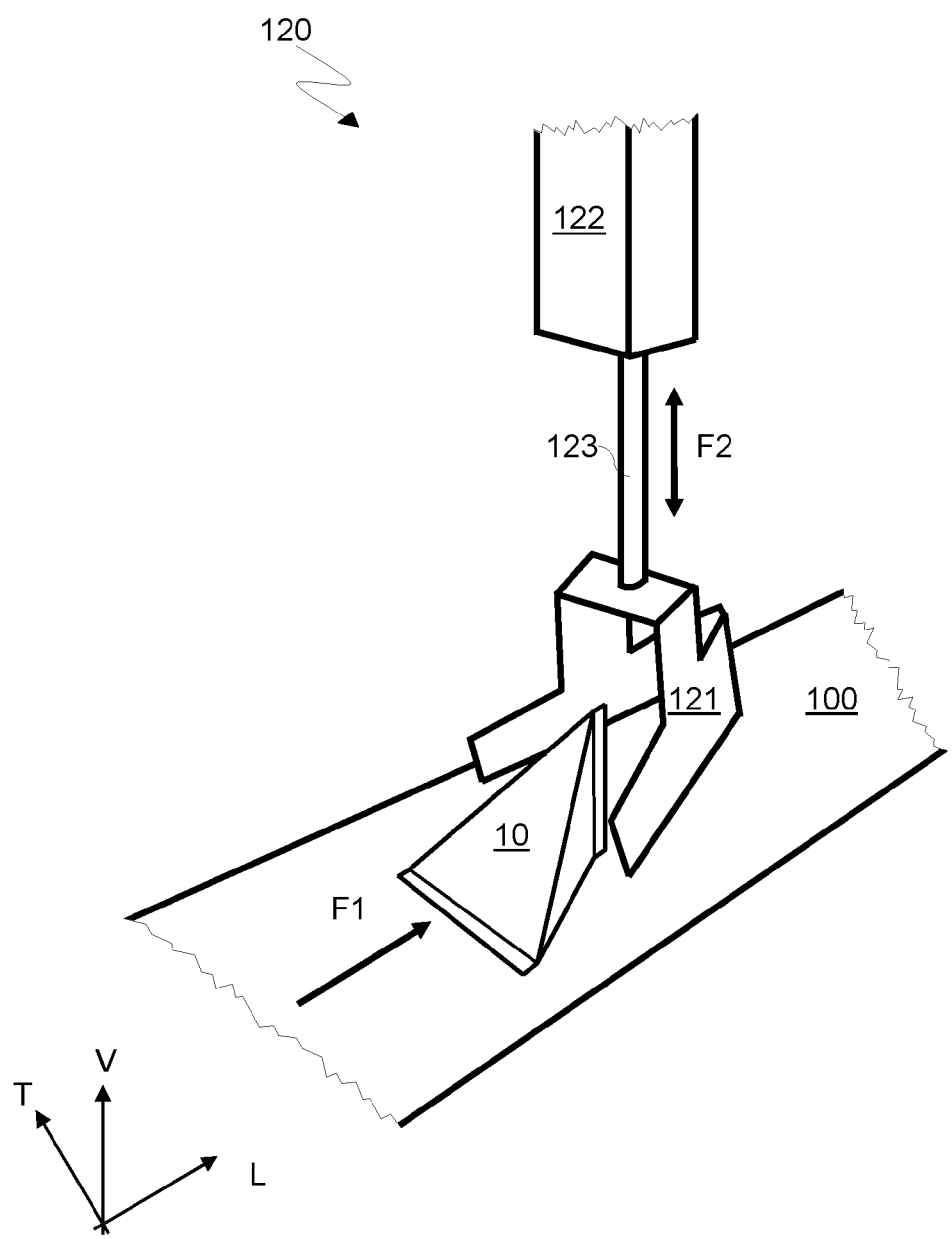
FIG. 10 shows a perspective view of a stopping device of the machine.

Referring to FIG. 10, it is seen that the stopping device 120 may comprise a first seat 121 having an internal recess comprising a dihedral configured so as to be able to receive, at least in part, a tetrahedral product 10 advancing on the conveyor belt 100 according to the direction indicated by the arrow F1. The stopping device 120 may further include a first actuator 122 which moves a rod 123 fastened to the first seat 121 so that it can be raised and lowered along the vertical direction V, as indicated by the arrow F2. In particular, the first seat 121, when it is in a lowered position, stops the tetrahedral product 10 while, when it is in a raised position, lets the tetrahedral product 10 advance to the subsequent step.

Figure 11:
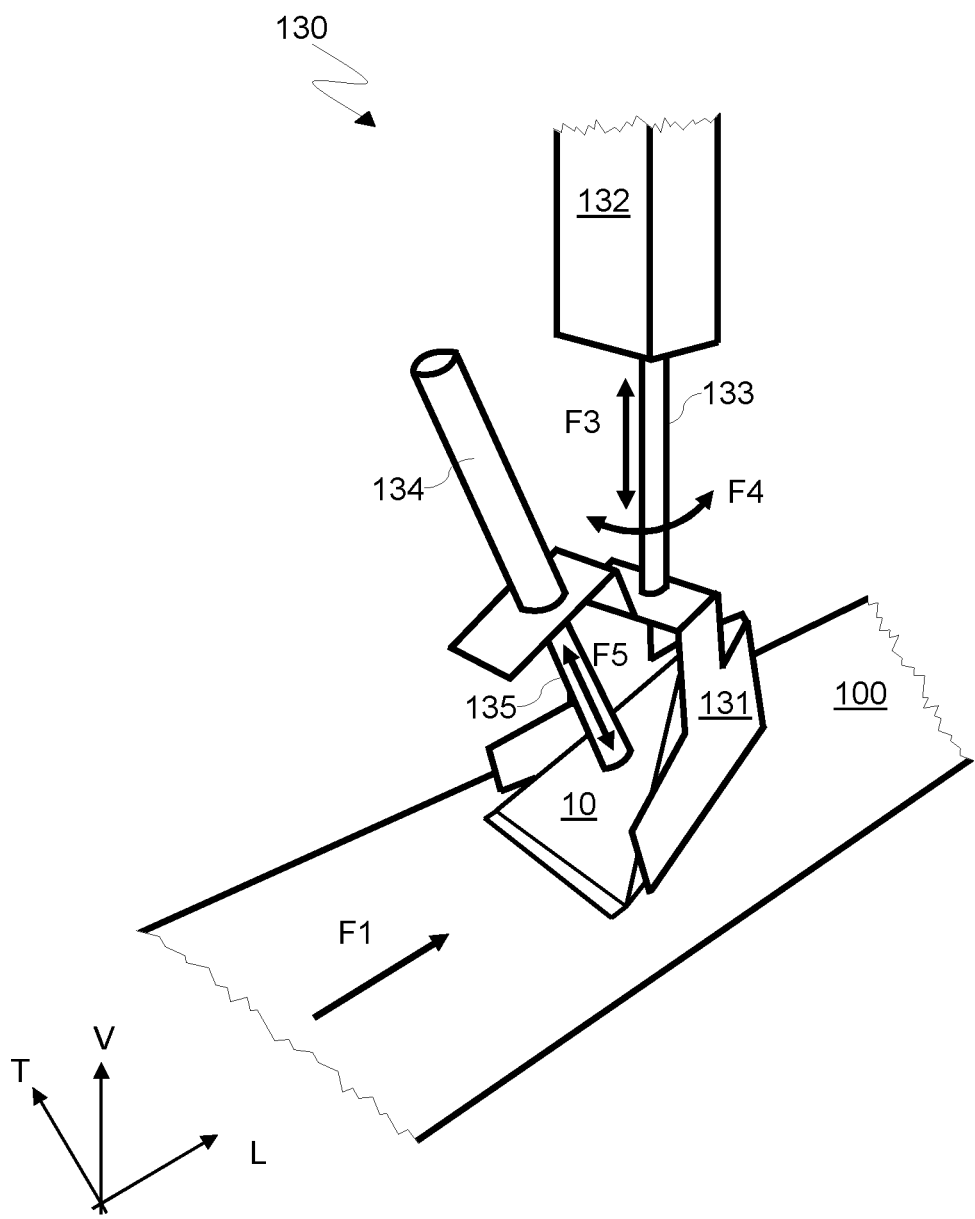
FIG. 11 shows a perspective view of a rotating device of the machine.

Referring to FIG. 11, it is seen that the rotating device 130 may comprise a second seat 131 similar to the first seat 121, as well as a second actuator 132 which moves a rod 133 fastened to the second seat 131 so that it can be raised and lowered in the vertical direction V, as indicated by the arrow F3. The second seat 131 can also rotate on the plane LT around the axis of the rod 133 in both clockwise and counterclockwise directions, as indicated by the arrow F4.

The rotating device 130 can advantageously comprise a safety stop 134 inside which a piston 135 can slide in the direction indicated by the arrow F5. In this way, if the piston 135 is lowered until it touches the tetrahedral product 10 when the latter is in the second seat 131 and before it is rotated, it is possible to prevent the tetrahedral product 10 from moving because of the centrifugal force due to the rotation of the second seat 131, in the transverse direction T.

Figure 12:
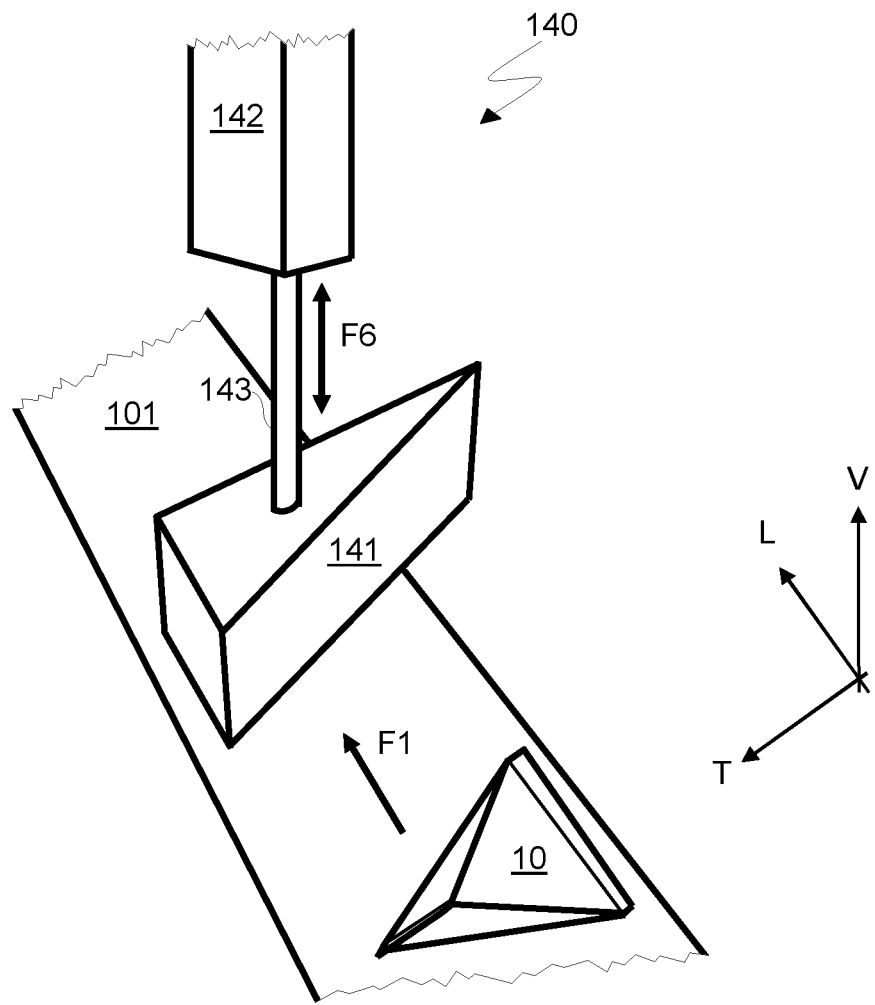
FIG. 12 shows a perspective view of a first accumulator of the machine.

Referring to FIG. 12, it is seen that the first accumulator 140 may include a first body 141, preferably wedge-shaped, oriented in such a way that its face turned towards the incoming tetrahedral product 10 is inclined in a manner corresponding to the inclination of the face of the tetrahedral product 10 with which it will come into contact with respect to the transverse axis T. Such first accumulator 140 may also comprise a third actuator 142 which moves a rod 143 fastened to the first body 141 so that it can be raised and lowered in the vertical direction V, as indicated by the arrow F6. Therefore, the first body 141 in the lowered position stops the tetrahedral product 10 and the other tetrahedral products 10 that are being accumulated behind it. The first body 141 in the raised position lets instead advance the row of tetrahedral products 10 to the subsequent fifth step of the process.

Figure 13:
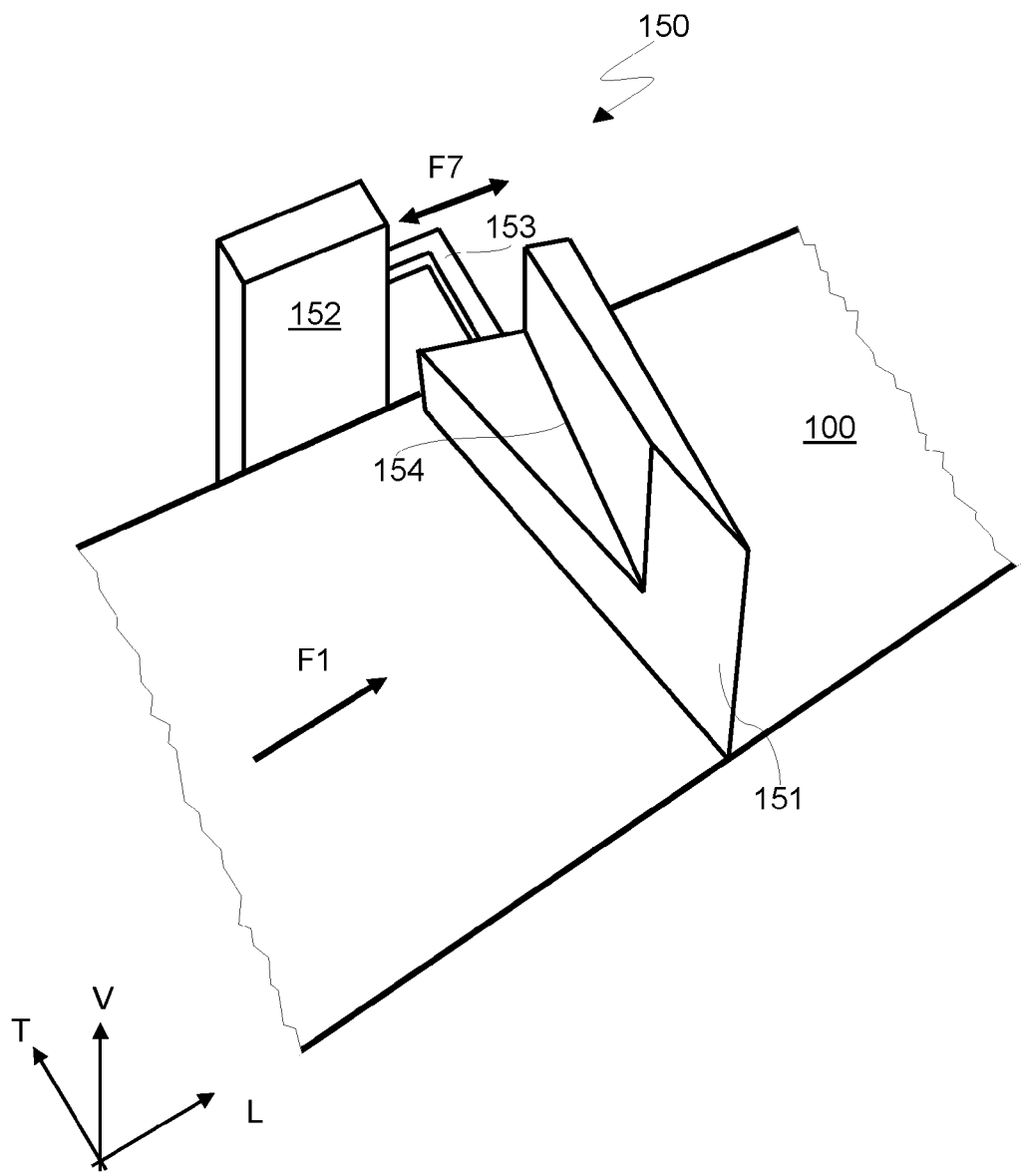
FIG. 13 shows a perspective view of a second accumulator of the machine.

Referring to FIG. 13, it is seen that the second accumulator 150 may comprise a second body 151, preferably wedge-shaped, oriented in such a way that its face turned towards the incoming tetrahedral product 10 is inclined in a manner corresponding to the inclination of the face of the product 10 with which it will come into contact with respect to the transverse axis T. Furthermore, the second body 151 can be worked to create a cavity 154 suitable to avoid interference problems with the grasping means 168.

The second accumulator 150 may include a fourth actuator 152 which moves a rod 153 fastened to the second body 151 so that it can be moved along the longitudinal direction L, as indicated by the arrow F7. In this way, once the handling head 167 has grasped the tetrahedral products 10, the danger that a tetrahedral product 10 is disengaged due to the sliding against the second body 151 is eliminated by moving the latter away from the tetrahedral product 10 which it is in contact with.

In the particular embodiment shown, the third conveyor belt 300 is parallel to the other two belts 100, 200 so as to obtain a machinery that takes up the least possible space within the structure in which it is placed. In an alternative embodiment the third conveyor belt 300 is substantially parallel to the transverse direction T, in which case the handling means 160 and 260 are rotated by 90° in order to move the tetrahedral products 10 on the plane LV.

The sensors 101, 201, 102, 202, 103, 203, 104, 204 may comprise for example cameras, photocells or any other equivalent means known to those skilled in the art.

The third conveyor belt 300 may be provided with a known machine (not shown in the figures) suitable to enclose the tetrahedral products 10 in a packaging, for example made up of a plastic sheet folded and welded along the sides. The tetrahedral products 10 enclosed in the packaging may in turn be arranged in a container 20.

Figure 14:
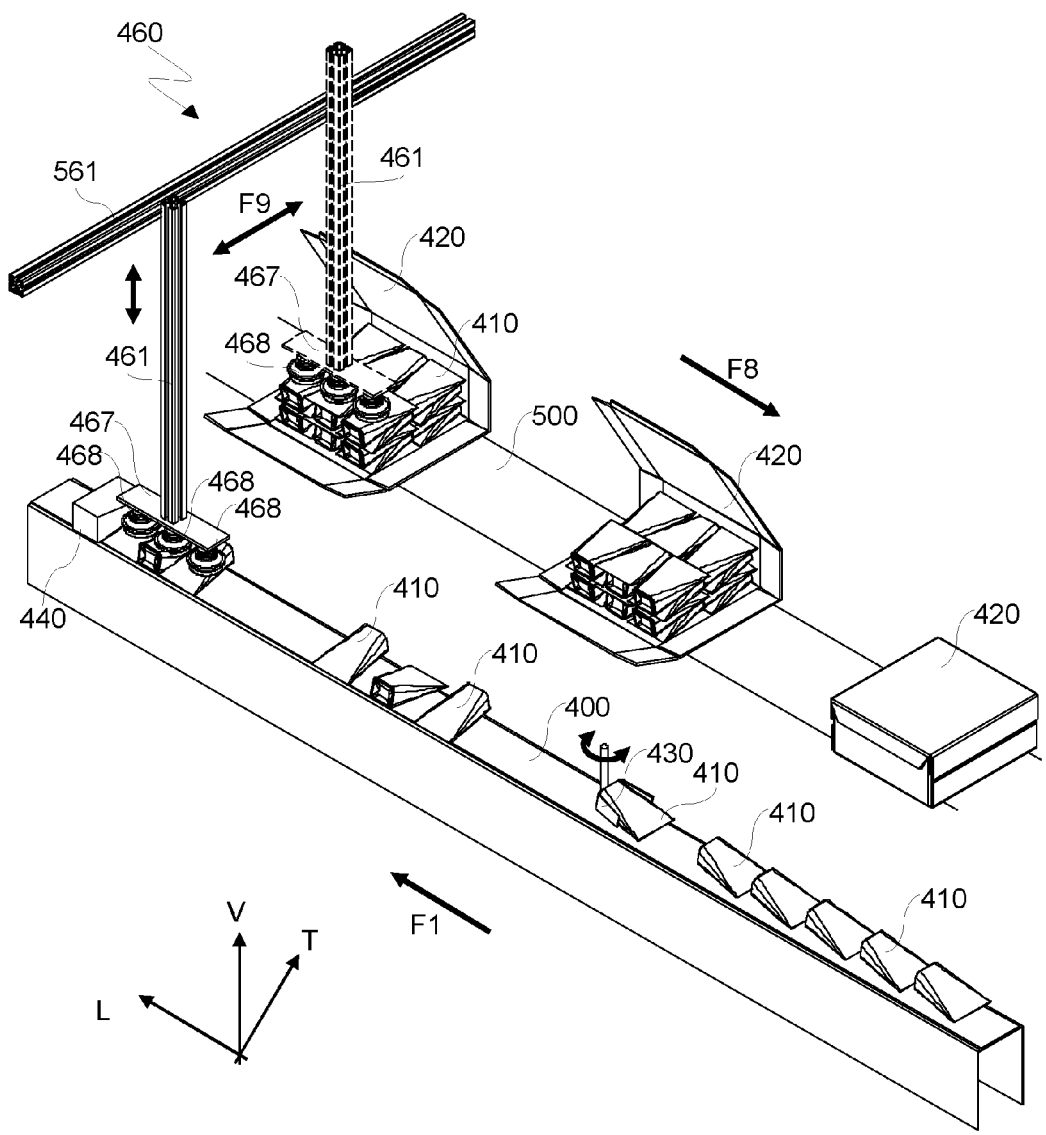
FIG. 14 shows a schematic perspective view of a second embodiment of the machine.

Referring to FIG. 14, it is seen that in a second embodiment similar to the first embodiment, the machine comprises a conveyor belt 400, operated in the direction F1 along a longitudinal direction L, and handling means 460 suitable to grasp tetrahedral products 410 transported by the conveyor belt 400 and to move them in the direction F9 along a transverse direction T. A handling head 467 of these handling means 460 comprises a plurality of grasping means 468 which include suction cups adapted to grasp by depression tetrahedral products 410 arranged on the conveyor belt 400. At least an accumulator 450 suitable to accumulate the tetrahedral products 410 on at least one row is arranged along the conveyor belt 400 at the handling means 460. At least one rotating device 430 is arranged along the conveyor belt 400 before the accumulator 450 for rotating by about 90° at least one tetrahedral product 410 in an opposite direction with respect to the previous tetrahedral product 410 on the same conveyor belt 400. The handling head 467 can move along the vertical axis V and the transverse axis T thanks to the handling means 460, which may for example include a first arm 461 which can slide along the vertical axis V and can be translated along the transverse axis T with respect to a second arm 561. The two arms 461, 561 are driven by two motors (not shown in the figure), for example with a handling system on two perpendicular axes, also of a known type. A further conveyor belt 500 is arranged beside the first conveyor belt 400 and is driven in the direction F8 opposite to the drive direction F1 of the first conveyor belt 400 to transport containers 420 to be filled with the tetrahedral products 410 that are released by the handling head 467 by removing the depression in the suction cups 468. The suction cups 468 allow to grab the products tetrahedral by aspirating a surface thereof, instead of one of their welding edges as in the first embodiment. With this arrangement, the handling means 460 can grasp and move tetrahedral products that have only one welding edge or no welding edge, for example when a portion thereof is truncated to obtain a further surface acting as a support base, such as in the case of the tetrahedral 410 products shown in the figure.

Any variants and/or additions may be made by those skilled in the art to the embodiments of the invention herein described and illustrated remaining within the scope of the following claims. In particular, further embodiments of the invention may comprise the technical features of one of the following claims with the addition of one or more technical features, taken singularly or in any mutual combination, described in the text and/or illustrated in the drawings.

The invention claimed is:

1. Machine for packing tetrahedral products, which comprises:
    a conveyor belt driven in a first direction (F1) along a longitudinal direction (L),
    a first handling means suitable for grasping tetrahedral products carried by the conveyor belt,
    wherein the first handling means comprises a handling head suitable for grasping a plurality of tetrahedral products arranged on the conveyor belt, in which one or more accumulators suitable for accumulating the tetrahedral products on one or more rows along the longitudinal direction (L) are arranged along the conveyor belt, wherein at least one rotating device is arranged along the conveyor belt before the accumulators for rotating a tetrahedral product with an orientation substantially opposite with respect to the preceding tetrahedral product on the conveyor belt.

2. Machine according to claim 1, wherein said handling head can move along at least two axes (T, V; L, V).

3. Machine according to claim 2, wherein said handling means comprise at least two arms.

4. Machine according to claim 3, wherein said arms are pivoted to a frame for rotating around substantially parallel axes, in which at least two connecting rods are pivoted between the arms and a joint connected to the handling head.

5. Machine according to claim 4, wherein said frame, said arms and said connecting rods form an articulated pentalateral.

6. Machine according to claim 3, wherein the two arms are driven by two motors.

7. Machine according to claim 1, wherein the handling head comprises a plurality of graspers arranged alternately on parallel rows.

8. Machine according to claim 1, wherein a plurality of arrangers are arranged along the conveyor belt for arranging the tetrahedral products on multiple rows.

9. Machine according to claim 1, further comprising at least two conveyor belts and at least two handling means, in which the first conveyor belt and the first handling means are arranged in an advanced position with respect to the second conveyor belt and to the second handling means, respectively.

10. Machine according to claim 1, wherein the handling means are arranged between a conveyor belt suitable for carrying the tetrahedral products and a further conveyor belt suitable for carrying containers to be filled with the tetrahedral products.

11. Machine according to claim 10, wherein the further conveyor belt is arranged alongside of the first conveyor belt or belts and it is driven in a direction (F8) opposite to the direction (F1) of operation of these first conveyor belts.

12. Machine according to claim 10, wherein the further conveyor belt is arranged in a manner substantially perpendicular to the first conveyor belt or belts.

13. Process for packing tetrahedral products comprising:
 a) arranging on a conveyor belt driven in a first direction (F1) along a longitudinal direction (L) at least one row of tetrahedral products oriented substantially in the same way;
 b) rotating the tetrahedral product of a row around a substantially vertical axis (V) so that it is arranged with a substantially opposite orientation with respect to the preceding tetrahedral product;
 c) accumulating on the conveyor belt the rotated tetrahedral products on a row along the longitudinal direction (L); and
 d) withdrawing simultaneously the accumulated tetrahedral products from the conveyor belt.

14. Process according to claim 13, wherein the tetrahedral products, before being rotated, are temporarily stopped on the conveyor belt in motion.

* * * * *